March 17, 1970  R. D. INGLEDEW ET AL  3,500,766
MACHINE FOR APPLYING DOUGH LIDS TO
FOOD-FILLED CONTAINERS
Filed April 26, 1968  8 Sheets-Sheet 1

INVENTOR
Roy Desmond Ingledew
BY David Anthony Lawrence
Pendleton, Newman,
Seibold & Williams
ATTORNEY March 17, 1970  R. D. INGLEDEW ET AL  3,500,766
MACHINE FOR APPLYING DOUGH LIDS TO
FOOD-FILLED CONTAINERS
Filed April 26, 1968  8 Sheets-Sheet 7

INVENTOR
Roy Desmond Ingledew
David Anthony Lawless
BY Pendleton, Neuman,
Seibold, & Williams
ATTORNEY

United States Patent Office 3,500,766
Patented Mar. 17, 1970

3,500,766
MACHINE FOR APPLYING DOUGH LIDS TO FOOD-FILLED CONTAINERS
Roy Desmond Ingledew, Greenford, and David Anthony Lawrence, Saltdean, Brighton, England, assignors to J. Lyons & Company Limited, Cadby Hall, London, England, a British company
Filed Apr. 26, 1968, Ser. No. 724,419
Int. Cl. A21c *11/00*
U.S. Cl. 107—1                    16 Claims

ABSTRACT OF THE DISCLOSURE

In a machine for applying dough lids to food-filled containers a dough lid is shaped between opposed forming members to a desired size and form. The members are held at respective hotter and cooler temperatures differing by an amount such that the formed lid adheres preferentially to the cooler member. This member may be initially beneath the dough and is then inverted before mating with the container. Air pressure may be used to assist retention of the lid on a member and/or to assist separation of the lid from the member.

---

The invention relates to machines for applying dough lids to food-filled containers, such as pies. Machines for lidding pies are already known, the usual practice in such machines being to apply to a filled pie bottom a dough lid exceeding the required size, which is then trimmed to the desired size. Considerable waste is thus produced.

It is an object of the present invention to provide a machine for applying dough lids to food-filled containers which enables wastage of dough to be reduced.

It is a further object of the invention to provide a machine for applying dough lids to food-filled containers by which a dough lid of predetermined size and form may be applied matingly to a food-filled container.

Another object of the invention is to provide a pie-lidding machine including improved means for producing separation of a dough lid from one of opposed forming members between which it has been shaped to a predetermined size and form.

Features and advantages of the invention will appear from the following description of embodiments thereof, given by way of example, in conjunction with the accompanying drawings in which.

Both forms of the invention to be described are concerned with applying a lid to a lidless pie; in these embodiments it is assumed that the pie is in a container, which can be of either the re-usuable or expendable types. While the invention is not limited to any special size or shape of pie, it has been used successfully with pies having a diameter of between about four and eight inches.

Figure 1:
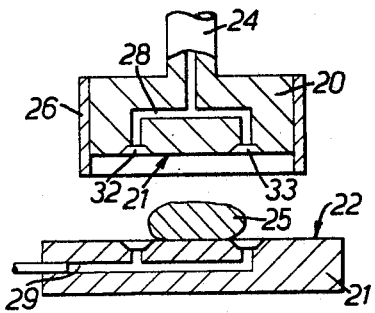
FIGURES 1 to 6 are a series of diagrams showing the successive stages in the preparation and application of a dough lid to a pie.

The pie tins, with the filling in them, and with or without a pastry lining as may be desired, are carried by means of a conveyor to a lidding station. Adjacent this station is a means for producing dough in predetermined portions; one suitable means for this purpose is a machine of the biscuit forming type, comprising a recessed roller into which dough is pressed by means of a doctor or scraper, the pieces of dough being then removed from the recesses. The dough portions thus prepared are transferred to the lidding means, as shown diagrammatically in FIGURE 1. Alternatively, portions of dough can be prepared manually from a known weight of dough, by dividing it into a predetermined number of similar portions or there can be used as volumetric divider in which a dough portion is measured by means of a piston displacement; the piston stroke can be adjustable. This lidding means comprises two members 20 and 21, which for convenience can be identified as a plunger and a platen respectively. The two members have flat or slightly contoured metal surfaces 22 and 23; the two members can be brought together for example by means of a suitably actuated ram 24, with a portion of dough 25 between them, thereby to form a lid. To provide a substantially closed moulding space, the plunger has a fitting surround or shield 26; conveniently the shield is resiliently biased downwardly, as by spring means not shown.

Figure 2:
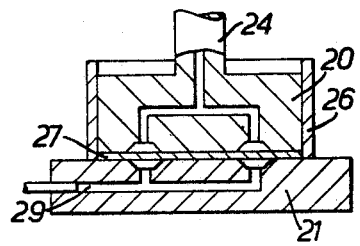

At the end of the downward stroke of plunger 83 the dough portion 25 is formed into a lid, as at 27, FIGURE 2. Means are provided for heating the surfaces 22 and 23 to different temperatures; in this embodiment it is assumed that the surface of the plate is the hotter. The temperatures used will depend upon conditions, and on the formulation of the dough, but with a dough such as might be suitable for pie lids, the temperature of the hotter surface may be in the range of 120° F. to 240° F., and that of the other surface 90° F. to 120° F. A suitable temperature in this range can be easily found by experiment. It is found that the smaller the pie lid the higher is the optimum temperature.

The reason for heating the two surfaces differentially is to ensure that when the two surfaces are separated the lid will adhere to one surface, the cooler, and break cleanly from the other, the hotter. Thus with this embodiment, when the two surfaces are separated, as in FIGURE 3 the lid will adhere to the cooler plunger surface 21 and break cleanly from surface 22 of the platen. The reason for the dough lid breaking from the hotter surface appears due to the fact that a suitable dough has a relatively high fat content.

Figure 3:
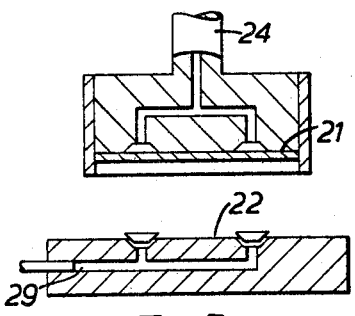

In order further to assist the holding of the lid on the one surface and its breaking from the other, the plunger and platen are provided with air passages 28, 29 respectively which lead to ports on the surfaces. When the parts separate as in FIGURE 3, passage 29 prevents suction building up, which would tend to hold the lid on the platen; if desired, positive or negative fluid pressures can be applied to the passages to supplement the operation. As indicated in FIGURE 3, the air passages may be initially closed by poppet valves which readily open to permit air flow, thus preventing undesired entry of dough into the air passages.

Figure 4:
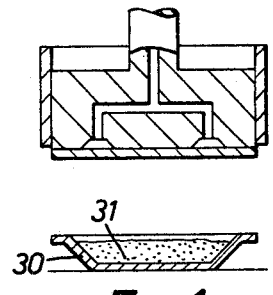
Figure 5:
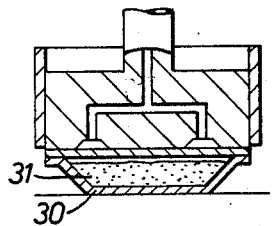

A lidless pie container 30, with its filling 31, and with or without a pastry lining as desired, is located beneath the plunger 20 with the lid 27 adhering to it, as in FIGURE 4. The plunger 20 is caused to project downwardly below shield 26, as shown, by means of the ram 24 and the plunger is lowered, pressing the pie lid 27 against the rim of the container, as in FIGURE 5.

The positioning of the plunger with respect to the lidless pie can be effected in a variety of ways, depending to a large extent on the nature of the machine used to carry out the lidding process for example, the machine can be of the conveyor type, carrying initially lidless and finally lidded pies on a conveyor, or a rotating or turret type multistation machine can be used. It may be more convenient to arrange that the plunger forms and picks up the lid at one position over the platen and then moves bodily, with lid, until it is positioned over the lidless pie, which can be on the conveyor or turret.

Figure 6:
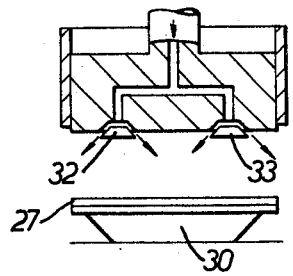
Figure 7:
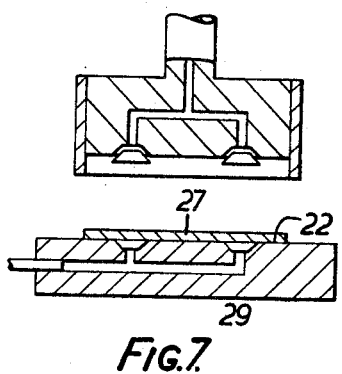
FIGURES 7 to 10 are diagrams of a modification of the embodiment of the FIGURES 1 to 6.

It is necessary now to separate the lid from the surface of the plunger and for this purpose fluid pressure is applied between the surfaces. In this embodiment air is admitted to an air passage 28 and the expulsion of this air through the valve-closed air outlets 32 and 33 in the surface causes the lid to separate cleanly as the plunger is raised and the pie lid is separated from its surface. The result is a lidded pie, as shown in FIGURE 6. There may be as many air outlets in the surfaces as may be necessary, to ensure that the pie lid will be released from these parts at the desired time.

It will be seen that by this means there is no waste of dough, and pie lids can be made which are of substantially uniform weight and thickness, which is advantageous in manufacture. The arrangements show a very material saving over the widely used method of providing lids for pies on a conveyor, in which a web of dough is laid over the assembly of pies and then trimmed to shape, the waste material having then to be recovered and returned to further processing.

Figure 8:
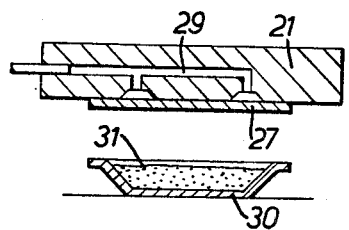

FIGURES 7, 8, 9 and 10 relate to a modification of the process described, in which the pie lid is first formed between the plunger and the platen, as shown in FIGURE 2 but on separation of the two members, the lid 27 is retained on the platen, as in FIGURE 3, with the lid adhering to it, assisted by suction applied to air passage 29 if necessary, the platen is now inverted, and positioned over the unlidded pie, as in FIGURE 8. For this, the platen is pivotally mounted and the pivot axis can be near the plane of the surface of the platen, or can be substantially displaced from it so that there is an appreciable bodily movement of the platen.

Figure 9:
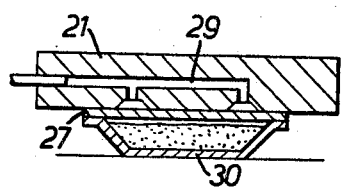
Figure 10:
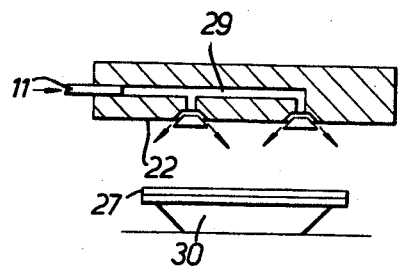

The inverted platen with the lid on it, is lowered on to the pie, as in FIGURE 9, and the platen is then separated from the pie, by any convenient relative movement, the separation of the lid from the platen being effected or assisted by air fed to passage 29.

It will be understood that in this process the platen will be operated at the lower temperature, the plunger at the higher temperature.

Figure 11:
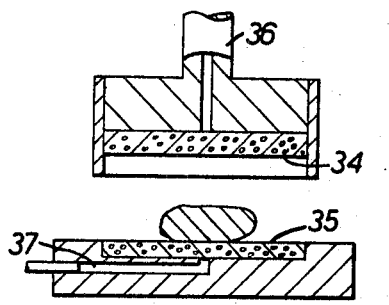
FIGURES 11 to 16 are diagrams, corresponding to FIGURES 1 to 6, of a further embodiment of the invention.
Figure 12:
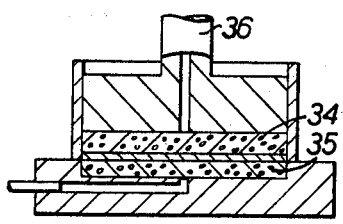
Figure 13:
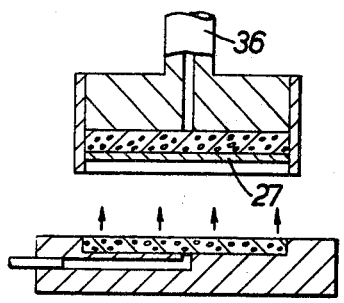
Figure 14:
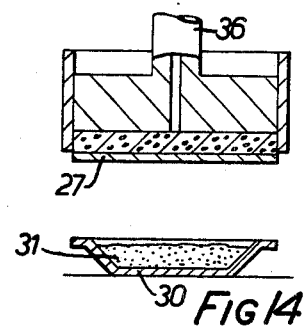
Figure 15:
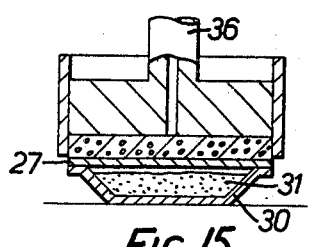
Figure 16:
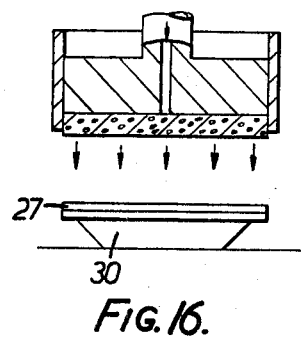
Figure 17:
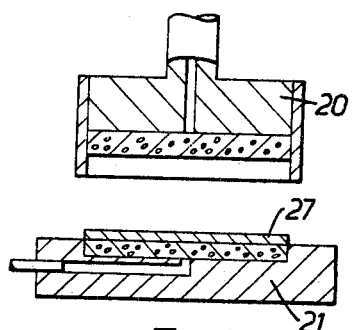
FIGURES 17 to 20 are diagrams of a modification of the embodiment of FIGURES 11 to 16.
Figure 18:
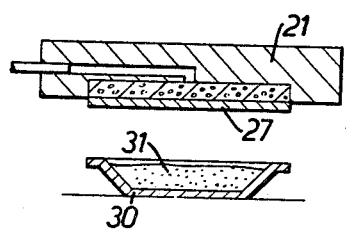
Figure 19:
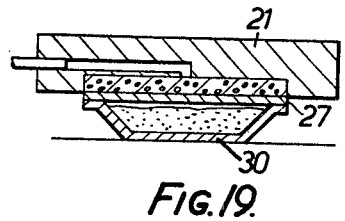
Figure 20:
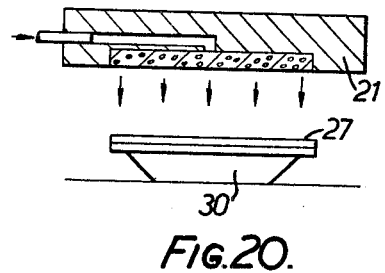

A further embodiment of the invention is shown in FIGURES 11 and 16; the process indicated in these figures is similar to that described with reference to FIGURES 1 to 6, the principal difference consisting in the fact that the surfaces, or suitable parts of the surfaces of the plunger and platen are formed of porous metal, indicated at 34 and 35. Air passages 36 and 37 are in communication with the porous parts of the surfaces, so that a positive or negative pressure can be established on the porous areas as required. The successive stages of operation can then otherwise be as described with FIGURES 1 to 6.

With this process the platen can be inverted if desired in the manner described in connection with FIGURES 7 to 10. FIGURES 17 to 20 illustrate this modification, it is considered that the manner of operation of these last two forms of the invention, to which FIGURES 11 to 20 relate, will be apparent without further detailed description.

Figure 21:
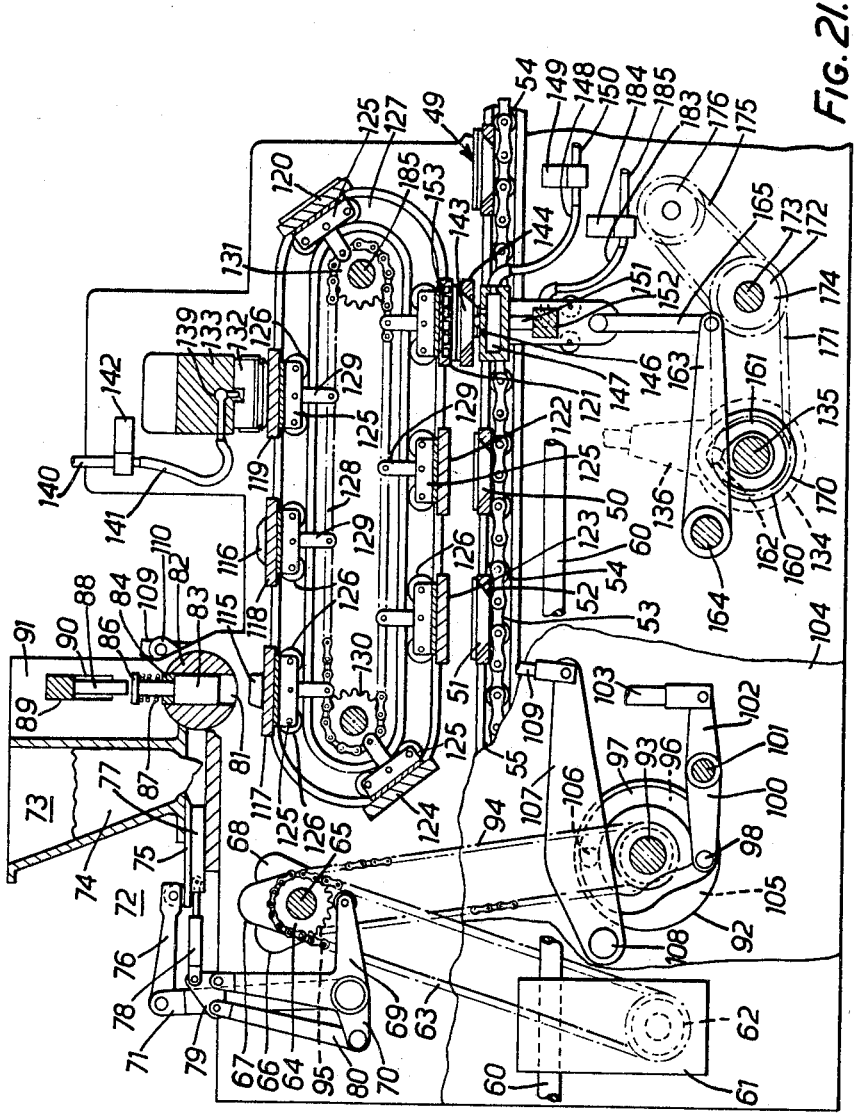
FIGURE 21 is a sectional elevation of one embodiment of pie-lidding apparatus embodying the present invention.

The embodiment of pie-lidding apparatus which is shown in FIGURE 21, with further details in FIGURES 22–28 comprises a main conveyor 49 which conveys filled lidless pies from an earlier part of the machine, with which the present invention is not concerned and which is therefore not illustrated, to a pie lidding position. The pies, which in this case are pastry-bottomed, though this is not necessarily the case, are contained in conventional metal-foil dishes such as 50 which rest in correspondingly shaped bottomless apertures such as 51 formed in carrier members 52. Carriers 52 are carried by but may be raised upwardly from a pair of conveyor chains of which one is shown at 53. Chains 53 are provided with guide rollers 54 which run in guide channels such as 55, secured to the machine frame. Conveyor chains 53 are arranged in known manner to be moved intermittently, being advanced at regular intervals through a distance equal to that between adjacent pie carriers.

The drive to the conveyor chains, which being conventional is not illustrated, is taken from a main drive shaft 60, from which all the elements of the machine are driven in order to ensure correctly related working of the parts. Shaft 60 passes through a reduction gearbox 61, an input wheel of which is driven by the shaft. The output shaft of gear-box 61 is coupled by way of a sprocket wheel 62 and a chain 63 with a further sprocket 64 fixed on a cam-shaft 65 carrying three cams 66, 67 and 68. Cams 66, 67 and 68 actuate respective rocking levers 69, 70 and 71 forming part of a dough-portioning mechanism designated generally by reference 72. Dough-portioning mechanism 72 is of a generally known type and is chosen to provide dough-portioning with minimum working of the dough.

Dough-portioning mechanism 72 comprises a dough hopper 73 into which is fed a supply of dough 74. Hopper 73 tapers downwardly and an aperture in its bottom allows the passage of the dough and, when an appropriate quantity of dough has passed through the aperture, is closed by a knife-edged cutter blade 75 mounted for horizontal reciprocating movement under the control of rocking lever 71, to the upper end of which it is connected by a connecting rod 76. After blade 75 has been advanced to cut off the dough portion, a ram 77 which is coupled by a connecting rod 78 to a bell-crank lever 79 pivoted upon the top of rocking lever 69 and connected with rocking lever 70 by a coupling rod 80, is urged forward in stages, first to gather the dough portion and then to urge it into a recess 81 formed in an oscillating cylindrical member 82. Recess 81 in cylinder 82 is formed by the end portion of a circular, diametral bore, within which works a plunger 83. This fits tightly within bore 81 and is retained by a ring-nut 84 through which passes a reduced-diameter portion 85 of plunger 83, which terminates outwardly of the bore by a flange 86. Between flange 86 and ring-nut 84 works a compression spring 87, the action of which is to draw plunger 83 into the bore until the engagement of the full-diameter portion 83 of the plunger with ring-nut 84 prevents further movement and thus determines the size of the recess and therefore the bulk of the dough portion which it contains. When a dough portion has been urged into recess 81 by ram 77, cylinder 82 is rotated through 90° into the position shown in the drawing. The flanged outer end of plunger 83 is then engaged by the end of a bar 88 projecting downwardly from a cross-head member 89 which is mounted for vertical reciprocating movement in slots such as 90 formed in the machine frame 91.

As plunger 83 is urged downwardly against resilient bias afforded by spring 87, the dough portion contained in recess 81 is ejected by air pressure on to a heated lid platen 117, the purpose and movement of which will be described later.

Figures 22, 23:
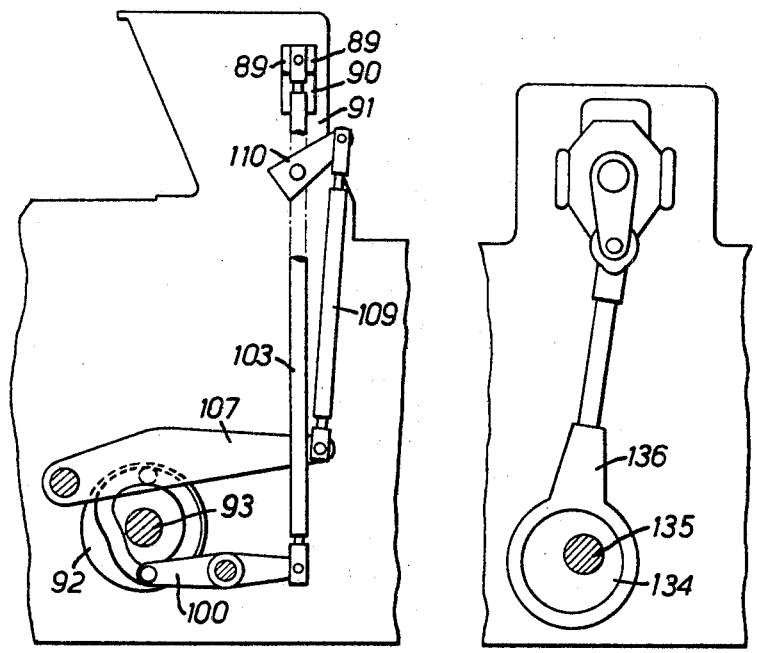
FIGURES 22 to 28 are detail drawings showing portions of the apparatus of FIGURE 21.
Figure 24:
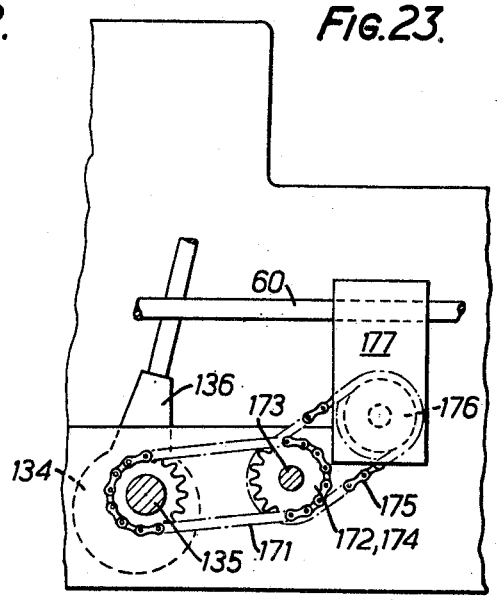

The movements of oscillating cylindrical member 82 are controlled by a face cam 92 fixed on a shaft 93 which is mounted for rotation in the machine frame and is coupled for rotation with cam-shaft 65 by a chain 94 engages in a sprocket 95 on cam-shaft 65 and a further sprocket 96 fixed on shaft 93. In a groove 97 formed in the face of cam 92 works a roller cam-follower 98 carried on a first-order lever 100 fixed on a rocker shaft 101 pivoted in the machine frame. To the end 102 of lever 100 remote from cam-follower 98 is pivoted a push-rod 103, which, as best seen in FIGURE 22, is pivoted also to one end of cross-head 89, so that as cam 92 rotates cross-head 89 periodically descends and then rises again. Rocker shaft 102 passes through the machine frame plates 104, 91 and carries at its far end a lever and push-rod (not shown) which control the movement of the other end of cross-head 89.

Behind cam 92 there is mounted on shaft 93 a further face cam 105, a groove formed in the face of which works a roller cam-follower 106 carried on a third-order lever 107. One end of lever 107 is fixed on a rocker shaft 108 pivoted in the machine frame, while at the other end of lever 107 is pivoted one end of a connecting rod 109. As best seen in FIGURE 22, the other end of connecting rod 109 is pivoted on the crank pin of a crank 110 mounted on a shaft extending from oscillating cylinder 82, thereby to control its 90° oscillating movement in appropriate timing to the movements of ram 77 and cross-head 89.

Figure 25:
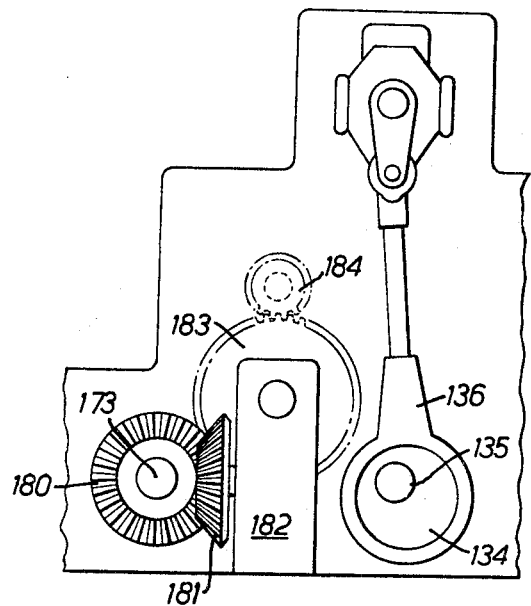
Figure 28:
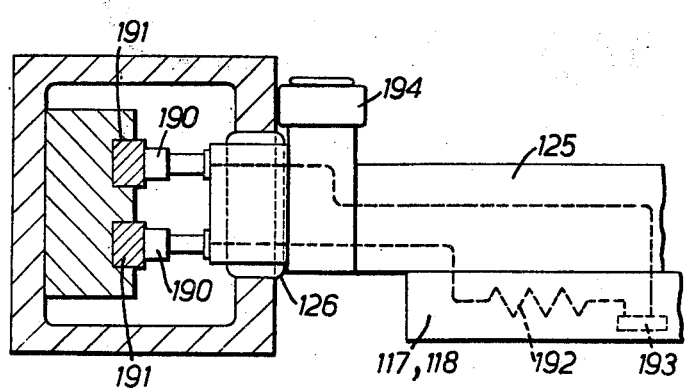

The dough portions such as 115, 116 are deposited upon heated lid platens 117, 118, 119, 120, 121, 122, 123, 124 which are supported by individual platen carriages 125. Carriages 125 are provided with guide wheels 126 travelling in a channel-section track 127 by which the carriages are guided in a closed path. As shown in FIGURE 28, each platen carriage is provided with resilient electrical contact brushes 190 extending from the carriage to make electrical contact with conductor rails 191 disposed within guide channel 127. The brushes are connected with electrical heating elements 192 in each platen which are thus fed, under the control of a thermostat 193 positioned within the platen, with electric heating current which maintains the platen temperature at a predetermined value. It will be seen that in addition to wheels 126 moving in guide channel 127, each platen carriage has a wheel 194 running against the face of the channel to provide lateral location of the platens 117–124 carried by the carriage. The movement of carriages 125 around the path defined by guide 127 is controlled by an endless chain 128, to uniformly spaced parts of which are attached links 129 attached also to carriages 125. Chain 128 passes over spaced-apart sprocket wheels 130, 131 of which the latter, as described later in relation to FIGURE 25, is driven intermittently, rotating at regular intervals through an amount sufficient to move the platens by an amount equal ot the distance between successive platens.

Figure 27:
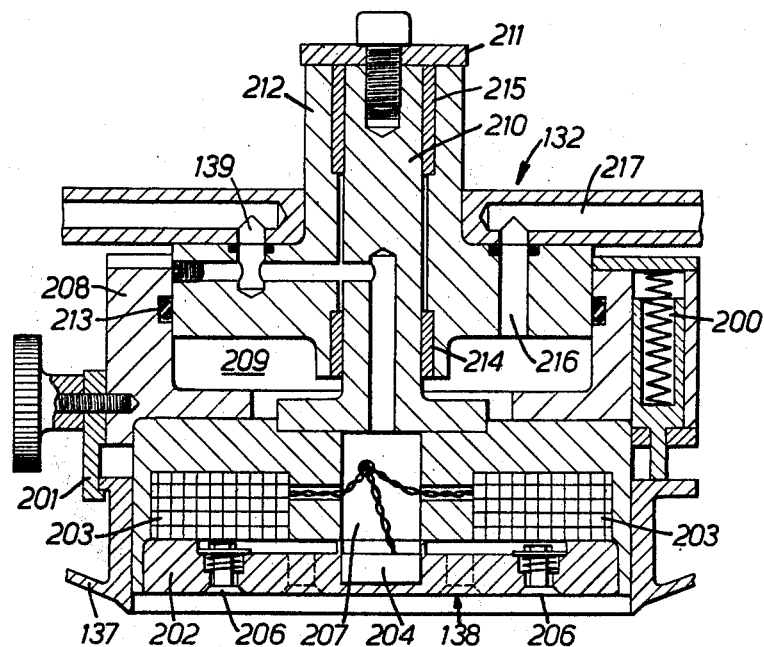

Thus a dough portion deposited on a platen will be moved in two stages, represented by the positions of platens 118, 119, to a position beneath a lid die 132 carried on a vertically reciprocating beam 133, raised and lowered by eccentrics, of which one is shown at 134 and which are connected to beam 133 by eccentric rods such as 136. Eccentrics 134 are fastened to a shaft 135. The beam drive is shown more clearly in FIGURE 24. As beam 133 descends, a resiliently downwardly biased shield member 137, which in the raised position of the die projects below the surface of a plunger member 138 as best seen in FIGURE 27, engages the platen to prevent outward spreading of the dough as it is compressed between the plunger and the platen. The dough is thus moulded between plunger, platen and shield to the desired dimensions and form of a pie lid. Die 132 then rises and as its temperature is adjusted by appropriate electrical heating means described below in relation to FIGURE 27 to a temperature lower than that of the platen, the formed dough lid will, on separation of the die and platen, adhere to the latter rather than to the former. As described below in relation to FIGURE 27, this action may be assisted by the provision of air passages within the die plunger, to which air under pressure is fed during the separation of the plunger from the lid. Air under pressure is applied to die 132 by way of a manifold 139, formed in beam 133, to which air from a pressure system represented only by a pipe 140 is fed through a flexible hose 141 under the control of an electromagnetically actuated valve 142.

Each platen 117–124, carrying a formed lid, moves in from the lid-forming position to the lidding position occupied in the drawing by platen 121, at which the platen is inverted immediately above a filled pie 143 supported by a carrier 144. Pie carrier 144 is then raised from conveyor chains 53 to the position shown by the action of a lifting beam 145. Beam 145 is provided with resilient suction nozzles 146 communicating with a manifold 147 formed within the lifting beam. Manifold 147 in turn communicates, by way of a flexible conduit 148 with an electromagnetic valve 149 which, when open, puts manifold 147 into communication with the suction side of an air pump (not shown). As shown in more detail in FIGURE 26, lifting beam 145 is carried on pillars 151 from a vertically reciprocating support beam 152. As lifting beam 145 rises so that suction nozzles 146 touch the underside of pie 143, valve 149 is opened by an appropriate electric current to allow air to be withdrawn from manifold 147 and cause suction nozzles 146 to ensure that pie 143 does not remain attached to the lid platen after lidding. Upward movement of pie 143 continues as beam 149 rises until the rim of the pie is urged against the lower surface of the pie lid attached to platen 121. The lifting beam then descends again and at this time air under pressure is supplied by means described in relation to FIGURE 26, to an air chamber 153 formed within platen 121, all other platens being similarly formed. Air chamber 153 communicates by way of air channels which, in the present instance are normally closed by poppet valves having surfaces normally flush with the surface of the platen, with the surface of the platen to which the lid adheres. The air under pressure thus fed between the pie lid and the platen surface ensures proper separation of the lid from the platen as the pie is lowered, so that the lid remains in position on the pie. The empty platens 122, 123, 124 then complete the circuit of the closed path defined by guide 127 to receive further dough portions in turn.

Figure 26:
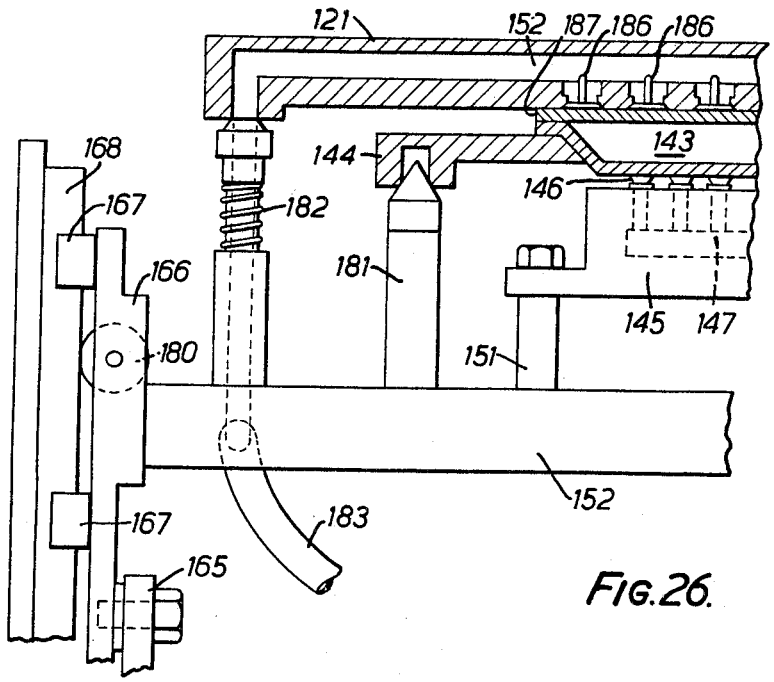

As best seen in FIGURE 26, each of the carriages 166 which guides support beam 152 has four wheels which engage a vertical rail 168 to keep the beam from rotation about its own axis and an additional wheel 180 which provides lateral guidance of the beam. Support beam 152 is provided with conically topped locating pins such as 181 which engage in mating holes formed in each pie carrier 144 as it is lifted, thus ensuring correct alignment between the pie 143 on the carrier and the lid 187 carried by the platen 121, the connections between which and its conveyor are now shown in FIGURE 26. A telescopic nozzle 182 extending upwardly from support beam 152 establishes an air conduit extending from an air chamber 153 in platen 121 to a flexible pipe 183 leading by way of an electromagnetically actuated valve 184 to a pipe 185 connected to the output of an air pump (not shown). Thus when valve 184 is opened in response to an appropriately controlled electric current, air under pressure flows into air chamber 153 and opens a plurality of poppet valves 186, shown only schematically in FIGURE 26, which are positioned in the surface of platen 121 to which pie lid 187 is adherent. The pie lid is thus detached from platen 121 and as listing beam 145 descends the pie carrier is restored to its normal position on the conveyor, carrying with it a lidded pie.

The movement of vertically reciprocating support beam 149 is controlled by face cams, of which one is shown at 160, fixed to shaft 135. In an endless groove 161 formed in the face of cam 160 works a roller cam-follower 162 carried on a third-order lever 163. Lever 163 is fixed on a rocking shaft 164 pivotally mounted on the machine frame. The end of lever 163 remote from rocking shaft 164 is coupled by way of a link 165 to the lower end of one of carriages 166 which guide the ends of beam 152. Carriage 166 is guided for vertical movement as already described in relation to FIGURE 26.

Shaft 135, upon which are mounted eccentrics 134 and cams 160, also carries a sprocket wheel 170 coupled by a chain 171 with a further sprocket wheel 172 mounted on an intermediate shaft 173. On shaft 173 is also mounted another sprocket wheel 174, which is drivingly coupled by way of a roller chain 175 with a sprocket wheel 176 on the output shaft of a reduction gear-box 177, seen in FIGURE 24. Gear-box 177 is conveniently identical with gear-box 61 and like that box is traversed by and driven by main drive shaft 60 so as to synchronize the whole operation of the machine.

Intermediate shaft 173 extends from side to side of the machine. On the end of shaft 173 remote from chain sprockets 172, 174 is fixed a bevel gear-wheel 180 (FIGURE 26). Bevel wheel 180 meshes with a further bevel gearwheel 181 mounted on the input shaft of an intermittent drive gear-box 182 of which the output shaft carries a large gear-wheel 183 meshing with a smaller gear-wheel 184 fixed on a shaft 185 which also carries sprocket 131 around which passes drive chain 128 for the platen carriages. Drive chain 128 is thus, as required, driven intermittently in synchronism with the movement of the die carriages 52 of the main conveyor.

The lid die assembly 132 shown in detail in FIGURE 27 comprises generally an annular shield member 137 surrounding a plunger assembly 138. Shield 137 is urged downwardly with respect to the plunger assembly 138 by springs 200 and its downward movement is limited by removable retaining hooks 201; only one spring and one hook are shown in FIGURE 27 though in practice at least two of each are used. Plunger assembly 138 includes a lower member 202 electrically heated by heater elements 203 controlled by a thermostat 204 and provided with air channels 205 connecting a plurality of poppet valves 206 to a central air channel 207 which communicates with manifold 139 already described. Member 202 forms the bottom member of an assembly including a member 208 which is provided with a central recess 209, which houses a central mounting stem 210 terminating in a screw-held disc 211 by which stem 210 is held within a bore in a piston-like mounting member 212. Member 212, which in operation is clamped to die beam 133, is air tightly sealed to member 208 by an O-ring 213 and to mounting stem 210 by sleeves 214 and 215 which prevent communication between manifold 139 and space 209. Instead, space 209 is connected by way of an air passage 216 formed in member 208, with a further manifold 217 permanently connected with an air supply at controlled pressure by means generally similar to those described in relation to manifold 139, save that the electromagnetically actuated valve 142 may be replaced by a reducing valve. Air space 208 thus provides a resilient cushion against which assembly 138 may rise if it should encounter an over-weight dough portion in its descent upon a platen. It would be possible to replace this air cushion by alternative resilient means, such as a spring or a foamed mass of resilient material.

We claim:

1. A machine for applying dough lids to food-filled containers, comprising in combination:
    first conveyor means for moving filled food containers along a predetermined first path;
    second conveyor means for conveying a plurality of platen means in a predetermined closed second path between a dough depositing position, a lid-forming position and a container-lidding position;
    a plurality of platen means, each said platen means having heater means for maintaining a surface thereof at a first predetermined temperature;
    dough portioning means at said dough depositing position operable to apply predetermined dough portions to said platen surfaces;
    lid-forming means operating to shape said dough portions on said platen means into lids of predetermined size and form, said lid-forming means including:
    a support member; means mounting said support member for reciprocating movement towards and away from said platen surface;
    die means including a die member having a forming surface and heater means for maintaining said forming surface at a second predetermined temperature;
    a shield member surrounding said forming surface and means mounting said shield member for resiliently biased reciprocating movement outwardly of said forming surface;
    means mounting said die means on said support member for reciprocating movement into contact with a dough portion on said platen surface at said lid-forming position thereby to form said dough portion into a dough lid of said predetermined size and form and for withdrawal therefrom, said second temperature exceeding said first temperature by an amount sufficient to cause said dough lid to adhere preferentially to said platen surface;
    and means at said container-lidding position for moving a filled container moving on said first predetermined path into mating engagement with a lid adherent to said platen surface of a platen moving on said second predetermined path, thereby to apply said lid to said container.

2. The machine claimed in claim 1 characterized in that said platen includes a chamber and has apertures connecting said chamber with said platen surface; said machine including a source of air under pressure and conduit means for establishing air-conveying connection between said source and said chamber thereby to apply said air pressure between said surface and said lid to assist separation therebetween.

3. The machine claimed in claim 2 characterized in that a said aperture includes a poppet valve having in its closed position a surface coincident with said platen surface.

4. The machine claimed in claim 1 wherein said first conveyor means includes support means for said containers, characterized in that said means for moving said filled container at said lidding position includes:
    lifting beam means extending transversely of said first conveyor means beneath said predetermined path;
    means mounting said lifting beam for vertical reciprocating movement; said lifting beam means having lifting means matingly engaging a said support means and having also a chamber formed therein;
    a source of reduced air pressure;
    an air valve;
    conduit means including said air valve connecting said air source to said chamber;
    a suction nozzle on said lifting beam, said nozzle extending from said chamber into contact with a said container in said support means;
    and drive means producing said reciprocating movement of said lifting beam means thereby to move said container into contact with said lid on said platen surface and to move the lidded container away from said platen surface.

5. The machine claimed in claim 1 characterized in that said die mounting means includes means supporting said die member for movement towards said support member and resilient bias means opposing said movement.

6. The machine claimed in claim 5 characterized in that said resilient bias means includes a variable-volume container; a source of air under pressure; and conduit means connecting said container with said source, said container being disposed for its volume to be reduced by said die member movement.

7. In a machine for applying dough lids to food-filled containers, the improvement comprising:
    first and second dough forming members, each said member having a respective dough-forming surface, means mounting said dough forming surfaces for relative reciprocating movement in a direction perpendicular thereto;
    heater means for each said member, said heater means operating to maintain said first and second members at respective hotter and cooler temperatures differing by a predetermined temperature difference;

a frame member surrounding one said dough-forming surface;

means mounting said frame member for reciprocating movement in a direction perpendicular to said surrounded surface;

resilient bias means urging said frame member towards the other of said surfaces;

dough portioning means operable to supply a predetermined dough portion to one of said dough-forming surfaces;

drive means producing mutual reciprocating movement of said surfaces whereby said dough portion is shaped by said surfaces and within said frame member into a lid of predetermined size and form;

said temperature difference having a value such that said dough lid adheres preferentially to one said surface.

8. The improvement claimed in claim 7 including means for varying fluid pressure between a said forming surface and said lid thereby to control separation therebetween.

9. The improvement claimed in claim 8 characterized in that said pressure varying means includes:

a chamber formed within said forming member having said surface;

a plurality of apertures connecting said chamber with said surface;

a source of air at a pressure different from atmospheric;

a first valve means;

and conduit means including said valve means connecting said air pressure source with said chamber.

10. The improvement claimed in claim 9 characterized in that said forming surface is the cooler of said surfaces and said pressure source is a source of air at a pressure below atmospheric, thereby to assist in maintaining said lid on said surface.

11. The improvement claimed in claim 9 including a porous metal member separating said chamber from said surface.

12. The improvement claimed in claim 9 characterized in that said pressure source is a source of air at a pressure above atmospheric, thereby to assist separation of said lid from said surface.

13. The improvement claimed in claim 12 including a poppet valve in a said port, said poppet valve when closed having a surface coincident with said forming surface, said valve opening in response to said fluid pressure against a resilient bias.

14. The improvement claimed in claim 12 and including also a second source of air at a pressure below atmospheric;

second valve means;

further conduit means including said valve means connecting said second source with said chamber;

and means operative to open said second and said first valve means cyclically in the order stated, whereby initially to retain said lid on said surface and subsequently to separate said lid therefrom.

15. The improvement claimed in claim 8 characterized in that said mounting means is a conveyor for moving said forming member in a closed path between said first and said second positions.

16. The improvement claimed in claim 7 characterized in that said dough forming member having said cooler surface is initially disposed beneath said hotter surface, including mounting means mounting said dough forming member for movement between a first position in which said surface is uppermost and a second position in which said surface is lowermost and drive means producing cyclic movement of said member between said positions.

References Cited

UNITED STATES PATENTS

| | | |
|---|---|---|
| 2,192,918 | 3/1940 | Kohler. |
| 2,280,324 | 4/1942 | Tracy. |
| 3,124,083 | 3/1964 | Atwood. |
| 3,335,677 | 8/1967 | Dalton et al. |

WALTER A. SCHEEL, Primary Examiner

ROBERT I. SMITH, Assistant Examiner

U.S. Cl. X.R.

107—15